United States Patent
Singhal et al.

(10) Patent No.: US 9,407,693 B2
(45) Date of Patent: Aug. 2, 2016

(54) NETWORK ROUTING OF ENDPOINTS TO CONTENT BASED ON CONTENT SWARMS

(75) Inventors: Sandeep Kishan Singhal, Kirkland, WA (US); Peter Bernard Key, Hardwick (GB); Ming Zhang, Bellevue, WA (US); Guobin Shen, Beijing (CN); Thomas Karagiannis, Cambridge (GB); Ayalvadi Jagannathan Ganesh, Bristol (GB)

(73) Assignee: Microsoft Technology Licensing, LLC, Remond, WA (US)

( * ) Notice: Subject to any disclaimer, the term of this patent is extended or adjusted under 35 U.S.C. 154(b) by 1854 days.

(21) Appl. No.: 11/866,811

(22) Filed: Oct. 3, 2007

(65) Prior Publication Data
US 2009/0092124 A1   Apr. 9, 2009

(51) Int. Cl.
*G06F 15/173*  (2006.01)
*H04L 29/08*  (2006.01)

(52) U.S. Cl.
CPC .......... *H04L 67/104* (2013.01); *H04L 67/1072* (2013.01); *H04L 67/327* (2013.01); *H04L 67/1065* (2013.01)

(58) Field of Classification Search
CPC .............. H04L 67/101; H04L 67/1065; H04L 67/1072; H04L 67/327; H04L 67/104; H04L 67/1076; H04L 67/108
USPC ........................................................ 709/226
See application file for complete search history.

(56) References Cited

U.S. PATENT DOCUMENTS

| | | | |
|---|---|---|---|
| 7,206,934 B2 | 4/2007 | Pabla et al. | |
| 7,251,681 B1 | 7/2007 | Gourlay | |
| 7,519,734 B1 * | 4/2009 | Dumitriu | H04L 67/1029 709/238 |
| 7,716,710 B1 * | 5/2010 | Everson et al. | 725/110 |
| 7,957,280 B2 * | 6/2011 | Cohen et al. | 370/230 |
| 8,082,348 B1 * | 12/2011 | Averbuj et al. | 709/227 |
| 8,386,630 B1 * | 2/2013 | Atzmon | 709/231 |
| 2002/0145981 A1 * | 10/2002 | Klinker et al. | 370/244 |
| 2002/0152293 A1 * | 10/2002 | Hahn et al. | 709/223 |
| 2004/0054807 A1 | 3/2004 | Harvey et al. | |
| 2004/0064693 A1 * | 4/2004 | Pabla et al. | 713/168 |
| 2004/0249970 A1 * | 12/2004 | Castro et al. | 709/238 |
| 2005/0015511 A1 * | 1/2005 | Izmailov et al. | 709/238 |
| 2005/0128944 A1 * | 6/2005 | Zhang et al. | 370/229 |
| 2005/0198286 A1 | 9/2005 | Xu et al. | |

(Continued)

OTHER PUBLICATIONS

MIT thesis 'A Distrbuted Hash Table' (Sep. 2005) to Dadek. ("Dadek").*

(Continued)

*Primary Examiner* — June Sison
(74) *Attorney, Agent, or Firm* — Sandy Swain; Micky Minhas

(57) ABSTRACT

Using location-independent names to identify content, a service for mapping endpoint requests to requested content. Content requested by an endpoint of the network is mapped to a dynamic "swarm" of server, peer, or other endpoints capable of supporting the content download. Content names are mapped to a dynamically generated content swarm, presenting a current set of hosts, which can provide the requested content. Optionally, varying degrees of explicit visibility into routing paths and the performance tradeoffs between those routing paths is supported. Based on a set of class of service parameters for a given request for content, a host can initiate route selection based on class of service parameters, predicated on routing metrics maintained by the network by cooperating endpoints and/or network routers.

19 Claims, 14 Drawing Sheets

(56) References Cited

U.S. PATENT DOCUMENTS

| | | | |
|---|---|---|---|
| 2005/0198328 A1* | 9/2005 | Lee | H04L 45/02 709/229 |
| 2005/0198351 A1* | 9/2005 | Nog | H04L 45/306 709/232 |
| 2005/0201302 A1 | 9/2005 | Gaddis et al. | |
| 2006/0056302 A1* | 3/2006 | Ahn | H04L 45/00 370/238 |
| 2006/0168318 A1 | 7/2006 | Twiss | |
| 2006/0239275 A1 | 10/2006 | Zlateff et al. | |
| 2006/0265508 A1 | 11/2006 | Angel et al. | |
| 2007/0028002 A1 | 2/2007 | McCanne | |
| 2007/0297417 A1* | 12/2007 | Cohen et al. | 370/395.42 |
| 2008/0189702 A1* | 8/2008 | Morgan et al. | 718/100 |
| 2008/0235746 A1* | 9/2008 | Peters et al. | 725/111 |
| 2008/0285577 A1* | 11/2008 | Zisapel et al. | 370/409 |
| 2008/0304493 A1* | 12/2008 | Marr et al. | 370/400 |
| 2009/0116484 A1* | 5/2009 | Buford | H04L 45/00 370/392 |
| 2009/0248872 A1* | 10/2009 | Luzzatti et al. | 709/226 |
| 2010/0064049 A1* | 3/2010 | Magharei et al. | 709/229 |
| 2010/0205282 A1* | 8/2010 | Takeda et al. | 709/220 |
| 2010/0241708 A1* | 9/2010 | Zuckerman et al. | 709/204 |
| 2011/0202679 A1* | 8/2011 | Cohen et al. | 709/238 |

OTHER PUBLICATIONS

Internet-Draft (draft-bryan-p2psip-reload-01) (Jul. 8, 2007) "REsource LOcation and Discovery (RELOAD)" to Bryan et al. ("Bryan").*

Internet-Draft (draft-jennings-p2psip-asp-00) 'Address Settlement by Peer to Peer' (Jul. 1, 2007) to Jennings et al. ("Jennings").*

IEEE article 'A Survey and comparison of Peer-to-Peer Overlay Network Schemes' (2005) to Lua et al. ("Lua").*

ACM article 'Can ISPS and P2P users cooperate for improved performance'; Aggarwal etal.; Jul. 2007.*

James X. Ci, et al. A Location Transparent and Cost Effective Routing Algorithm for mobile Componentware Interaction and Coordination. Aug. 6, 2007. http://ieeexplore.ieee.org/iel5/7810/21465/00995169.pdf?isNumber=.

Henry N Jerez, et al. A Mobile Transient Internet Architecture. Aug. 6, 2007. http://arxiv.org/ftp/cs/papers/0610/0610100.pdf.

P. Janacik, et al. A Routing Approach Using Swarm-Intelligence for Resource Sharing in Wireless Ad Hoc Networks. Aug. 6, 2007. http://ieeexplore.ieee.org/iel5/9665/30546/01409526.pdf?isNumber=.

Atul Singh, et al. A Survey of P2P Middlewares. Aug. 6, 2007. https://www.cs.tcd.ie/publications/tech-reports/reports.07/TCD-CS-2007-28.pdf.

* cited by examiner

NETWORK ROUTING OF ENDPOINTS TO CONTENT BASED ON CONTENT SWARMS

TECHNICAL FIELD

The subject disclosure relates to routing network endpoints to requested content, independent of the location of the content, in a networked environment, such as the Internet, via a set of content providers.

BACKGROUND

By way of background, the Internet Protocol (IP) is a data-oriented protocol used for communicating data across a packet-switched internetwork. IP is a network layer protocol of the Internet protocol suite, which is encapsulated in the data link layer protocol. As a lower layer protocol, IP provides the service of communicable unique global addressing amongst computers of a network, such as the Internet.

Data from an upper layer protocol is encapsulated inside one or more packets, also referred to as datagrams. Unlike Public Switched Telephone Networks (PSTNs), with packet-switched networks, no specific connection or setup is needed before one host tries to send packets to another host with which it has not communicated previously. In this regard, IP is considered a connectionless protocol since messages can be sent to any device whose address is specified with an IP address.

Because of encapsulation, IP can be used over heterogeneous network(s), i.e., two computers can connect via any mixture or variety of disparate kinds of networking technologies, e.g., any one or more of Ethernet, asynchronous transfer mode (ATM), Fiber Distributed Data Interface (FDDI), cable, Wi-Fi, token ring, etc., and it makes no difference to the upper layer protocols. Address resolution of IP addresses to data link addresses is handled by the Address Resolution Protocol (ARP).

At bottom, IP provides an unreliable service, however since it provides a best effort delivery as opposed to guaranteed delivery. This means that the network makes no guarantees about what happens to packets and none, some, or all of the following may apply, without applying more stringent rules at the routers or endpoints: data corruption, packets arrive out of order sent, duplicate arrival or lost or dropped/discarded packets. The primary reason for the lack of reliability is owed to an original design that sought to reduce the complexity of routers needed to support IP traffic.

Routers thus have carte blanche to do as they please with packets, though anything less than best efforts yields a poor experience for the user. So, even though no guarantees are made, the better the effort made by the network, the better the experience for the user, which places a heavy burden on routers.

More generally, routing is defined as the process of selecting paths in a network along which to send data. Routing is performed for many kinds of networks, including the telephone network, the Internet, and transport networks. Routing directs the forwarding, or the passing, of logically addressed packets from their source toward their ultimate destination through intermediary nodes, routers, bridges, gateways, firewalls, switches, etc.

Routing schemes differ in their delivery semantics: unicast delivers a message to a single specified node; broadcast delivers a message to all nodes in the network; multicast delivers a message to a group of nodes that have expressed interest in receiving the message; and anycast delivers a message to any one out of a group of nodes, typically the one nearest to the source. Unicast is the dominant form of message delivery on the Internet, i.e., typically communications involve one node sending another node a message, or vice versa.

Today, the routing process directs forwarding based on routing tables, which maintain a record of the routes to various network destinations. Thus constructing routing tables, which are held in the routers' memory, becomes very important for efficient routing. Small networks may involve manually configured routing tables, while larger networks involve complex topologies and may change rapidly, making the manual construction of routing tables infeasible.

Today's routing is also complicated by the fact that no single entity is responsible for selecting paths: instead, multiple entities, such as different ISPs, are involved in selecting paths or even parts of a single path. Complications or inefficiency can result if these entities choose paths to optimize their own objectives selfishly, which may conflict with the objectives of other participants.

In this regard, several themes emerge about the original design of the Internet that are in conflict with present computing trends and network uses. First, it was originally assumed that content is located at a single, static location. Second, it was assumed that, while clients and servers may join or leave the network, routes between existing clients and servers are relatively fixed. Lastly, as evidenced by the choice to leave routing responsibility with routers, operated by disparate parties, it was assumed that in fact full network state can be managed responsibly by the routers themselves.

However, increasingly, these assumptions are being challenged by actual network usage. Advancements in networking speeds have untethered content from any one location by allowing it to be widely distributed, easily copied or moved to other machines. The numbers of hardware elements comprising the network and independent network entities operating them have also exploded, making routing a living, breathing organism that is subject to rapid change across all of the paths of the network, making path quality difficult to predict.

Additionally, a main feature of IPv6 (Internet Protocol version 6) that is driving adoption today is the larger address space: addresses in IPv6 are 128 bits long versus 32 bits in IPv4. The larger address space avoids the potential exhaustion of the IPv4 address space without the need for network address translation (NAT) and other devices that break the end-to-end nature of Internet traffic. It also makes administration of medium and large networks simpler, by avoiding the need for complex subnetting schemes. However, IPv6 is quickly challenging the assumption that full network state can be maintained by routers due to significant increases in overhead. For instance, any state information that exponentially increases with the number of endpoints will quickly explode the sheer amounts of data that a router must track for different endpoints, e.g., according to end-to-end routing techniques.

It would thus be desirable to provide a network routing system that is free from the constraints of original Internet design. Specifically, it would be desirable to provide a system that assumes desired content can be located anywhere in the network, not at any one machine, or any set of static locations. It would be further desirable to provide a system that routes between nodes as routes between nodes constantly evolve. It would be further desirable to free routers from maintaining increasingly overwhelming amounts of network state.

Accordingly, as the above background illustrates, network routing in the current Internet infrastructure no longer maps well to the way content has come to be distributed across an increasingly complex evolving network topology. Thus, more effective techniques for routing between any endpoint requesting content and a host of devices who can provide the content in the network are desired. The above-described deficiencies of network routing techniques are merely intended to provide an overview of some of the problems of conventional systems, and are not intended to be exhaustive. Other problems with the state of the art and corresponding benefits of the invention may become further apparent upon review of the following description of various non-limiting embodiments of the invention.

SUMMARY

In consideration of the deficiencies of conventional techniques, the invention provides a service for mapping endpoint requests to requested content using location-independent names to identify content. Content requested by an endpoint of the network is mapped to a dynamic "swarm" of server, peer, or other endpoints capable of supporting the content download.

Optionally, varying degrees of explicit visibility into routing paths and the performance tradeoffs between those routing paths is supported, for optimal routing to optimal endpoints for providing the download. Based on a set of class of service parameters for a given request for content, a host can initiate route selection based on class of service parameters, predicated on routing metrics maintained by the network by cooperating endpoints and/or network routers.

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments of the invention in a simplified form as a prelude to the more detailed description of the various embodiments of the invention that follows.

BRIEF DESCRIPTION OF THE DRAWINGS

Various techniques for network routing of content to endpoints based on content swarms are further described with reference to the accompanying drawings in which.

DETAILED DESCRIPTION

Overview

As mentioned in the background, today's Internet was designed around several assumptions: (1) Content is located at a single, usually fixed, location, (2) Routes between clients and servers are generally fixed and (3) Full network state can be managed by the routers on their own.

Yet, at the same time, several trends or forces are pushing against or conspiring to invalidate these assumptions. First, content is increasingly being placed at multiple servers in different locations. However, when a variety of endpoints can satisfy the request, a client requesting a particular piece of content typically exercises no favoritism as to from where the content comes.

Figure 1:
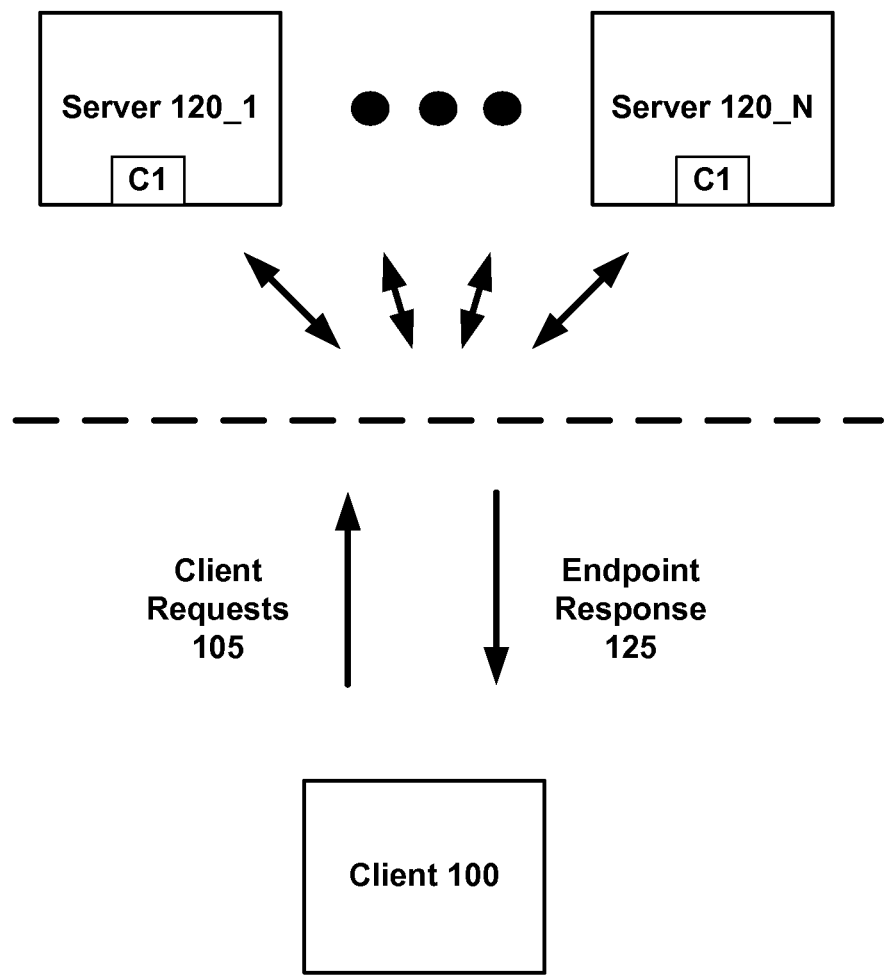
FIG. 1 illustrates an aspect of a limitation on Internet architectures addressed by the present invention.

This is illustrated conceptually in FIG. 1. When a client 100 makes a request 105 for a piece of content, e.g., content C1, there may be a whole host of endpoints on the Internet that can technically provide the content C1. Any one of servers 120_1 to 120_N could deliver the content C1 as part of a response 125. While limited file exchange systems exist, they are not unlimited in that they apply to only certain types of objects, but not for others. Thus, what is desired is a universal system for obtaining any kind of content efficiently.

However, what is of interest from an efficiency standpoint, is to make a subset of nodes available to the client 100, such that the nodes of the subset are more likely to provide a better experience for the client 100 with respect to obtaining content C1 than just "any node" of all of the nodes, or any one specific node. The subset may in the extreme include all nodes that can provide the content where only a few nodes contain the content, or a single node in a degenerate case.

Figure 2:
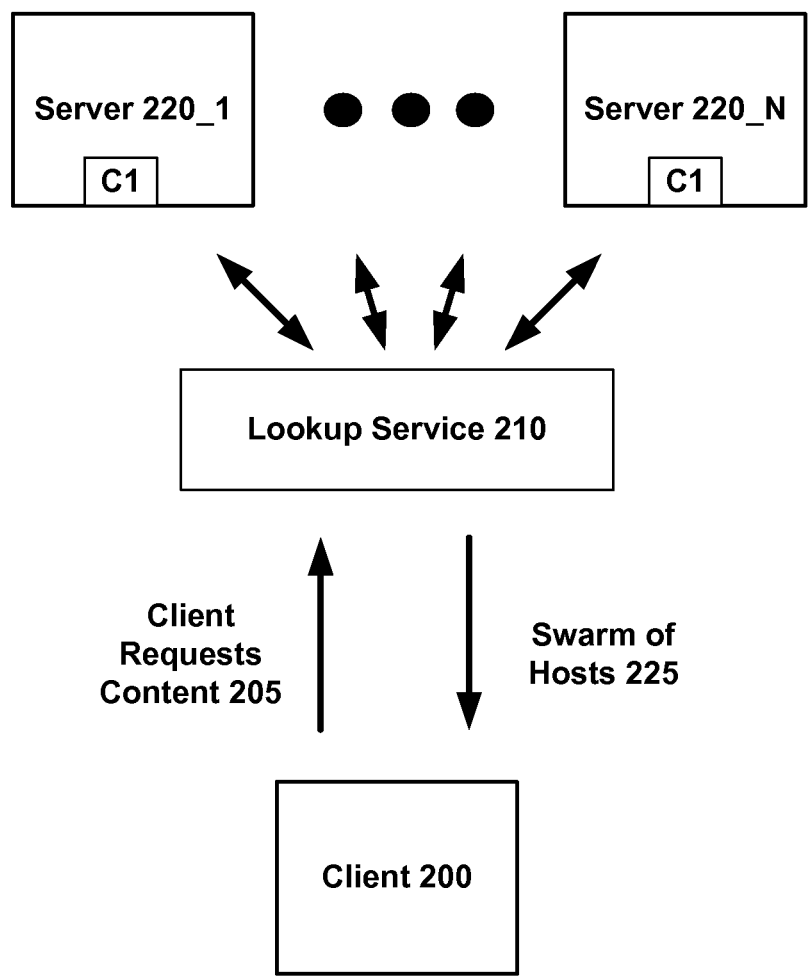
FIG. 2 is a block diagram illustrative of an exemplary non-limiting network service provided to endpoints for network routing in accordance with the invention.

Thus, in accordance with the invention and illustrated generally in FIG. 2, a client 200 can consult a lookup service 210, either maintained centrally or in a distributed manner in the network, by requesting a piece of content at 205 by unique name, e.g., content C1. Lookup service 210 in turn maps the unique content name to a set of servers 220_1 to 220_N (N>>), which contain the content C1, returning all or some of the endpoints as a swarm of hosts 225 that can provide the content C1 to client 200. The selection of endpoints that comprise the swarm 225 can be made according to some pre-determined criteria that filter out low value service providers as endpoints in the swarm.

Figure 3:
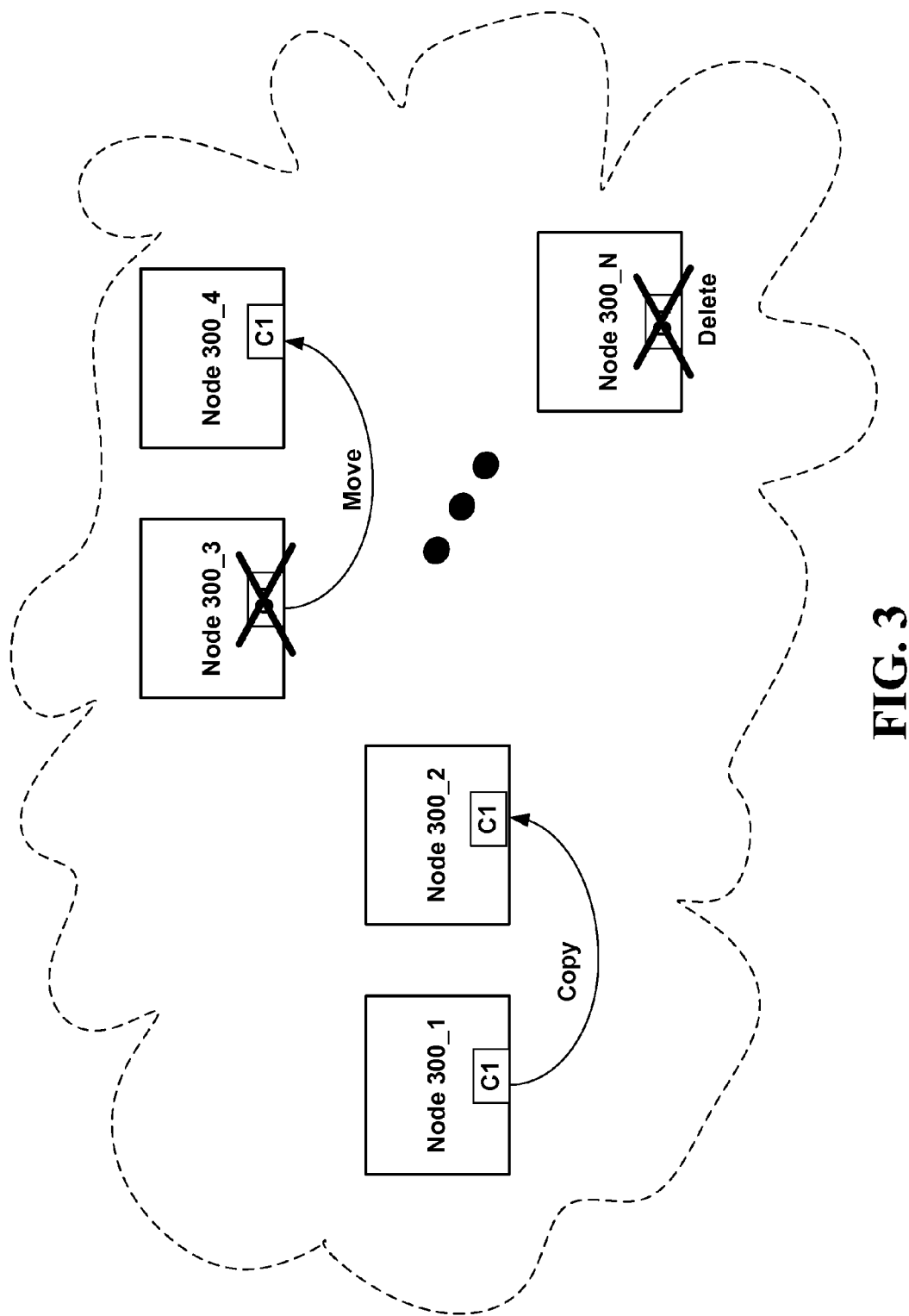
FIG. 3 illustrates another aspect of a limitation on Internet architectures addressed by the present invention.

Second, content publishers are increasingly mobile due to the ease with which content can be moved. This is illustrated generally in FIG. 3, wherein a single piece of content C1, e.g., a movie trailer for a new Batman movie, may distribute across the network with rapid speed, quickly changing the location dynamics for the piece of content. For instance, at any given moment, a copy of C1 may be emailed or otherwise transmitted from Node 300_1 to Node 300_2. Or, the content might be moved from Node 300_3 to Node 300_4. Or similarly, other nodes such as node 300_N may be deleting the content C1. Thus, physical location in storage for a piece of content across the network can be fleeting, and can also distribute or proliferate in such a manner as to make a dynamic choice of from where to retrieve content better than the current static view implemented by present routing infrastructure.

Figure 4:
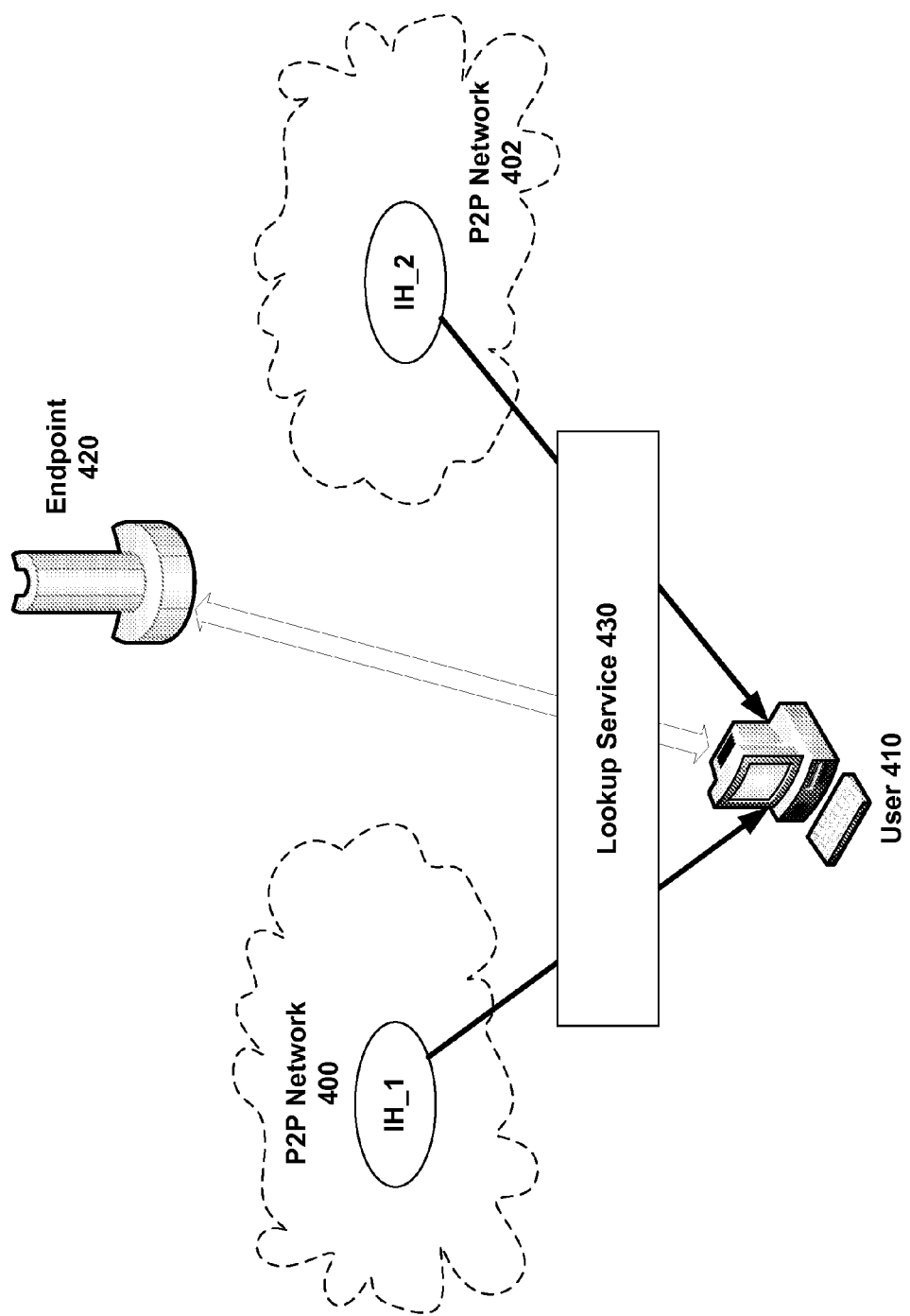
FIG. 4 illustrates yet another aspect of a limitation on Internet architectures addressed by the present invention.

Moreover, in peer-to-peer environments, content is often dynamically cached at intermediate hosts, which are highly capable of serving that content, but are nonetheless underutilized in today's IP architecture. For instance, as shown in FIG. 4, typically today, a user 410 wishing to retrieve content is limited to retrieving the content from specific endpoint 420 where user 410 knows the content to be. However, often, there are intermediate hosts such as IH_1 and IH_2 of P2P networks 400 and 402, respectively, which include the content in an efficient memory format for delivering the content and may be otherwise more capable than endpoint 420 at delivering the content. Accordingly, with the invention, lookup service 430 enables intermediate hosts IH_1 to communicate content cached at those locations to the mapping service provided by a lookup service 430 in accordance with the invention.

Furthermore, different applications have different class of service requirements from the network. Still further, as mentioned above, IPv6 is poised to explode the amount of static routing state that must be maintained by Internet routers. Accordingly, in various non-limiting embodiments described in more detail below, the invention provides a network service for endpoints to consult when seeking the best providers for requested content by creating a dynamically updated universal library or distributed data store of mappings from specific pieces of content as designated by unique content name identifiers to specific endpoints containing those pieces of content as designated by unique endpoint name identifiers.

In this regard, the invention addresses these current trends by providing various embodiments of an improved Internet architecture, described in more detail below with respect to non-limiting implementations. In one aspect, the invention uses location-independent names to identify content to address the deficient assumption that content is located on fixed machines. In another aspect, the invention maps content requested by an endpoint of the network to a dynamic "swarm" of server, peer, or other endpoints capable of supporting the content download. Content swarms can include a variety of content sources, active clients, contributing caches, etc., i.e., anywhere where content may be located. Advantageously, in accordance with the invention, content names are mapped to a dynamically generated content swarm, presenting a current set of hosts, which can provide the requested content.

Moreover, optionally, the invention supports varying degrees of explicit visibility into routing paths and the performance tradeoffs between those routing paths. As a result, choices can be made on behalf of clients by the network, or clients can make their own network routing choices based on characteristics provided about different available routing paths to the content of interest. In this regard, based on a set of class of service parameters for a given request for content, the invention enables a host to initiate route selection based on class of service parameters, predicated on routing metrics maintained by the network by cooperating endpoints.

Location Independent Content Routing Via Content Swarms

As mentioned, various embodiments of the invention provide improved routing techniques for content discovery among other endpoints of a network. In one aspect, the invention unties content from the location of the content by assigning names, not physical locations, to identify content. Based on the naming convention for individual pieces of content, the invention then provides a lookup service that maps content requested by an endpoint of the network to a dynamic "swarm" of server, peer, or other endpoints capable of supporting the content download.

Content swarms can include a variety of content sources, active clients, contributing caches, etc., i.e., anywhere where the content may be located. The lookup service is dynamically updated and so the list of content hosts that can service a content request can change along with changes in content locations and network topologies. Advantageously, in accordance with the invention, content names are mapped to a dynamically generated content swarm, presenting a current set of hosts, which can provide the requested content.

Figure 5:
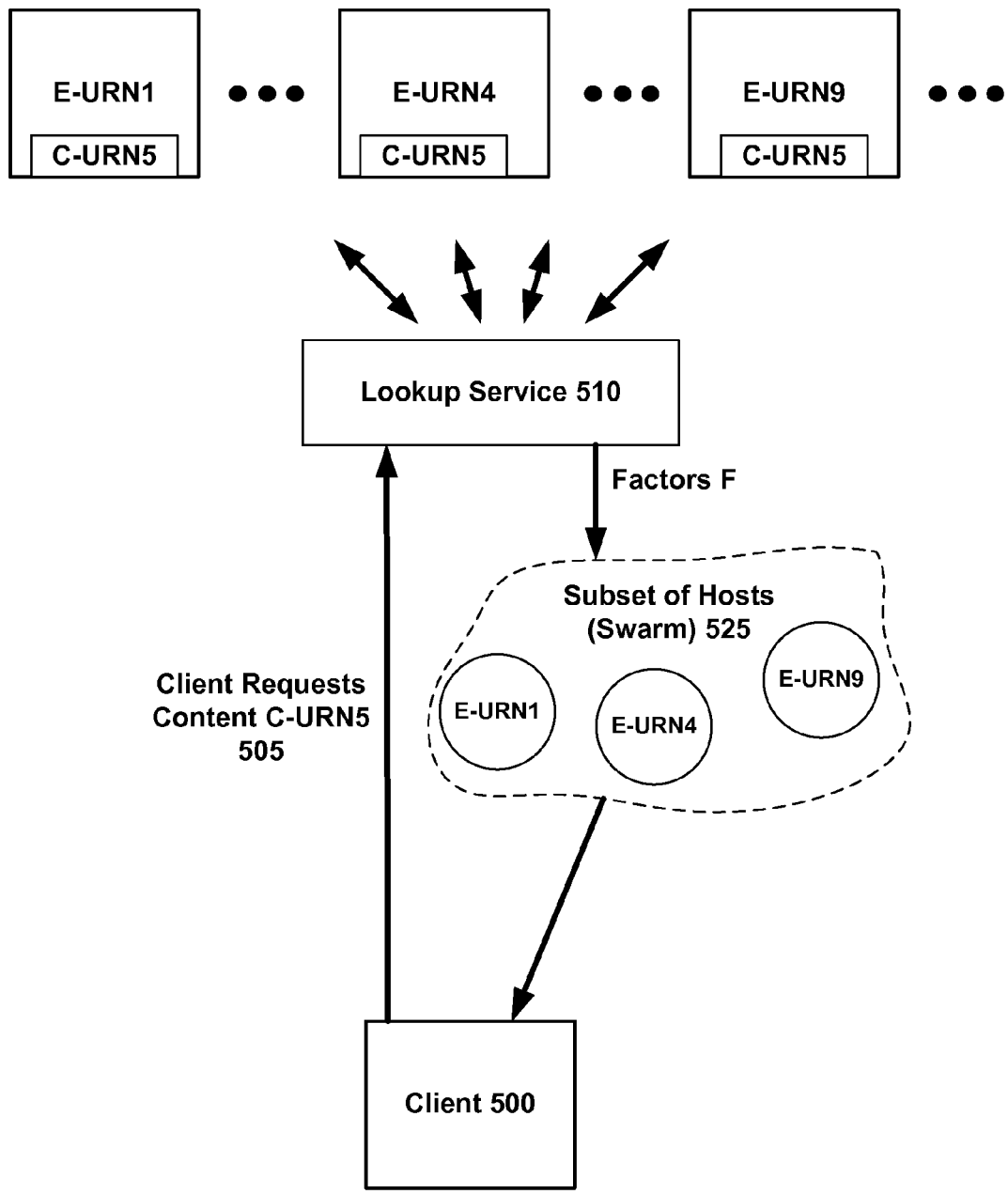
FIG. 5 is a block diagram illustrating an exemplary non-limiting content swarm in accordance with the invention.

As shown in FIG. 5, a variety of factors F can go into the decision of presenting the set of nodes comprising the swarm to present to the requesting device. A set of nodes that are close to the requesting endpoint in terms of network distance can be selected as part of the swarm selection decision. A set of nodes that have provided good historical service can be factored into the swarm selection, and so on. In this regard, any intelligent subset of nodes selected for client 500.

In the example of FIG. 5, when client 500 requests, for instance, content having the unique name C-URN5 at 505, the lookup service 510 determines an intelligent subset 525 of endpoints E-URN1, ..., E-URN4, ..., E-URN9, ... that can provide the content C-URN5. These endpoints E-URN1, E-URN4, E-URN9 containing the requested content (other endpoints without the content not shown) are then presented to, or identified for, client 500. The actual selection of an optimal endpoint can be performed by lookup service 510, by another service, or by client 500.

Optionally, the invention supports varying degrees of explicit visibility into routing paths and the performance tradeoffs between those routing paths, so that choices can be made on behalf of clients by the network, or so that clients can make their own choices of network routing based on characteristics provided about different available routing paths to the content of interest. In this regard, based on a set of class of service parameters for a given request for content, the invention enables a host to specify a piece of content and a set of class of service parameters that must be met by an application, and the set of hosts that can service the content request can then be filtered based on current network routing characteristics associated with the set of hosts.

Advantageously, the invention is applicable to any kind of content, i.e., the techniques of the invention are independent of the structure of the content being requested, whether a Word processing document, image, video, email, HTML web page, database object, advertisement, etc., and independent of any underlying proprietary or specialized technologies required to interface to the content.

Figure 6:
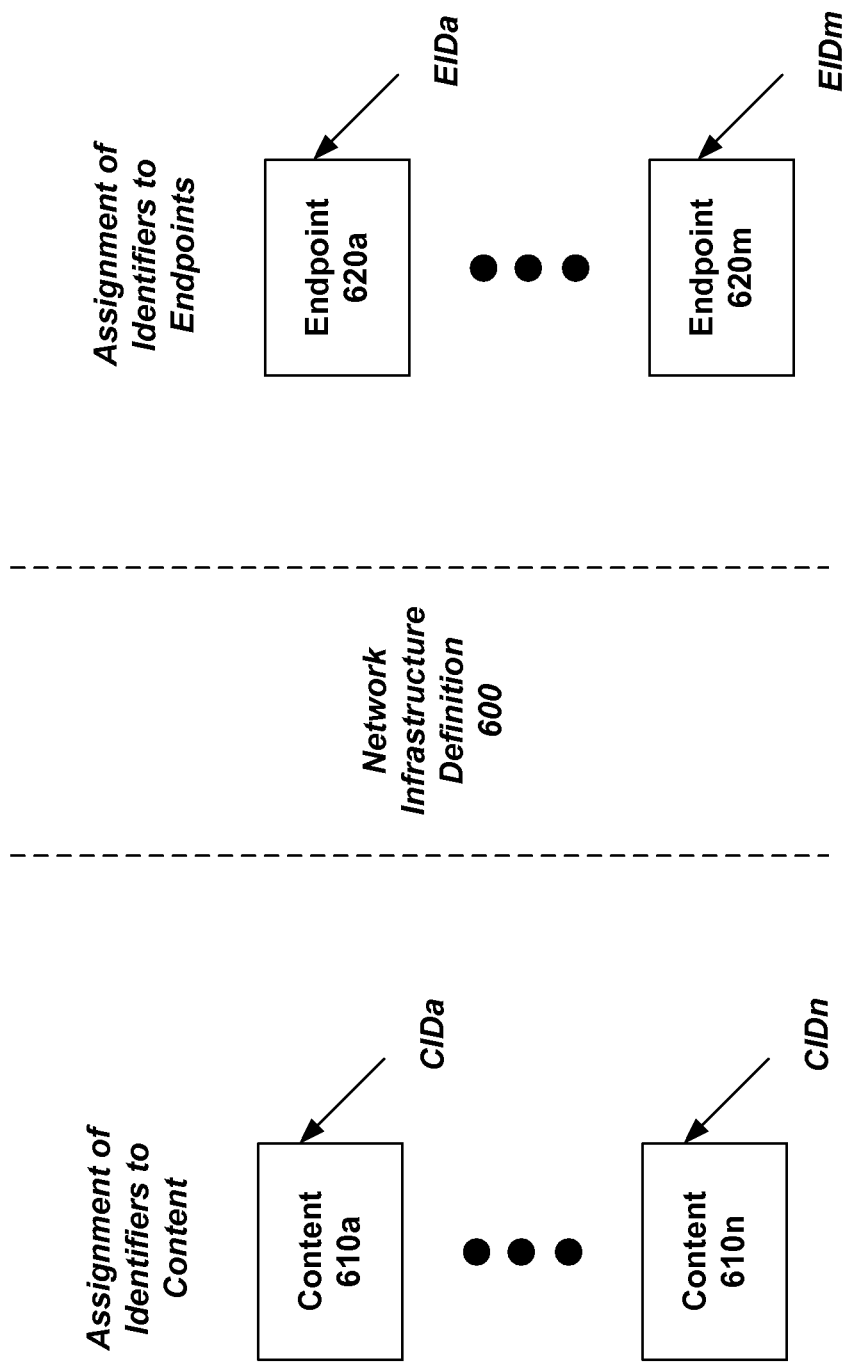
FIG. 6 illustrates an exemplary non-limiting process for assigning unique identifications to content and endpoints in accordance with the invention.

In various non-limiting implementations of the lookup service for endpoints in accordance with the invention, as shown in FIG. 6, the invention is predicated on an infrastructure 600 that assigns all content and endpoints unique identifiers. Thus, all content 610a, ..., 610n (n>>) is assigned a Content Universal Resource Name (C-URN) CIDa, ..., CIDn, respectively, that identifies the content independent of the location. The Batman movie trailer is the same Batman movie trailer whether it is located on a machine in Zimbabwe, or on a machine in California. A unique C-URN thus represents or identifies the Batman movie trailer independently of where copies may physically stored, and independently of how many copies there are. In this regard, it is noted it need not be assumed that the C-URN is user-friendly, e.g., it may be a large hexadecimal number, long text string, etc. In reality, due to the large amount of different content available via the Internet, it is preferable that the number of unique C-URNs that can be defined according to the C-URN naming is an extremely large number. When content is created or updated, the content is assigned a unique C-URN As further illustrated in FIG. 6, all endpoints 620a, ..., 620m of the network are assigned an Endpoint Universal Resource Name (E-URN) EIDa, ..., EIDm that uniquely identifies the endpoint. The endpoint might be a host, a host/port combination, or even a specific process or RPC endpoint. The E-URN may take any form, including a textual form or even simply an opaque number, as long as it is unique. New endpoints are assigned E-URNs when they join the network in order to participate in the efficient content routing of the invention.

Figure 7:
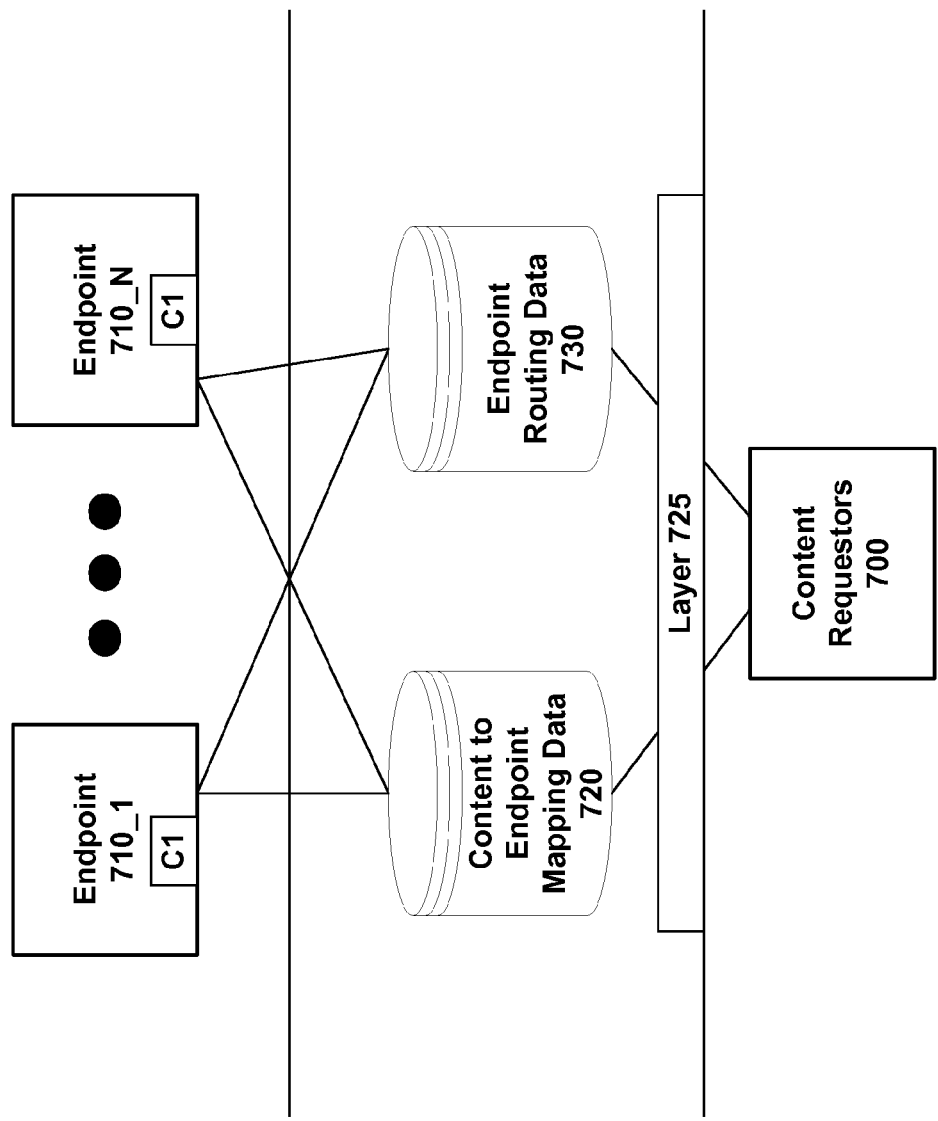
FIG. 7 illustrates exemplary network data stores maintained in accordance with the techniques for network routing of content based on content swarms in accordance with the invention.

In accordance with the invention, based on C-URNs and E-URNs defined in a network, two separate storage abstractions are made accessible to endpoints so that improved routing can occur for requested content. The storage abstractions can be implemented in either centralized or distributed format for access by endpoints in the network. Storage abstractions 720 and 730 of FIG. 7 are depicted as a single block for conceptual ease, though for the avoidance of doubt, storage 720 and 730 may be distributed across the network at the endpoints themselves or otherwise distributed at well placed intermediate points across network space. Thus, to map client 700 requests for content C-URNs to endpoints E-URNs 710_1, ..., 710_N that contain the content and can provide the service to the client 700, in one non-limiting embodiment, two distributed hash tables are constructed over the network, e.g., Internet.

First, a content mapping table 720 is used to map C-URNs to E-URNs. As content is dynamically published, moved, or cached, entries are added or modified in the content mapping table 720. Through this content mapping table 720, a device coupled to the network can dynamically learn about available endpoints for a given C-URN, i.e., a client 700 can learn current information about where the desired content is, and optionally, how difficult.

Second, an endpoint routing table 730 can be used to construct end-to-end routes between hosts and targeted endpoints. The endpoint routing table 730 can be constructed with the participation of end hosts and/or Internet routers, and with a variety of different granularities and kinds of information about the routing paths between hosts and targeted endpoints, so that clients can be provided with information about the quality of different hosts and endpoints.

Figure 8:
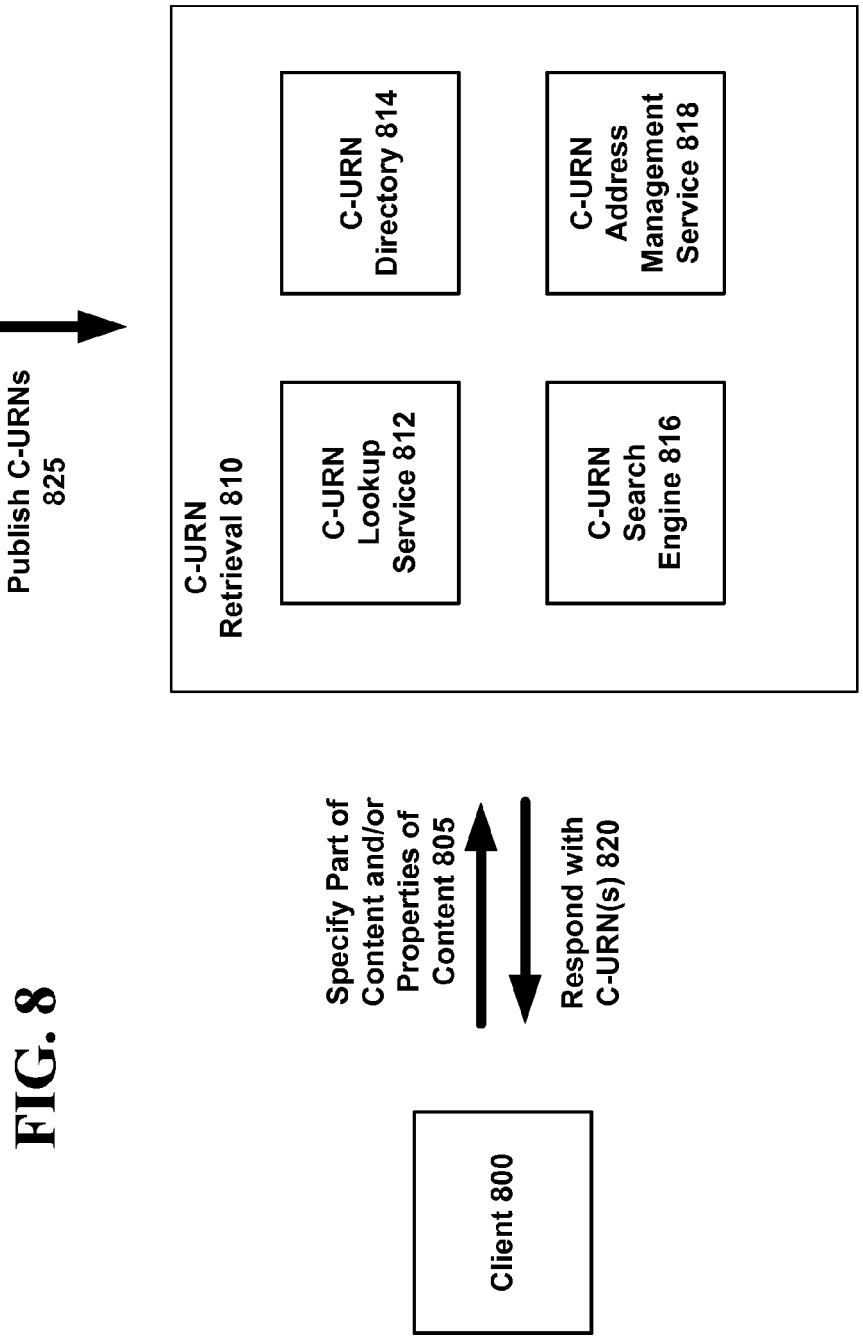
FIG. 8 is a representative block diagram of a process for discovering a unique identifier for content requested by a client in accordance with the invention.

In operation, when a client desires a piece of content, a C-URN may already be known for the content as part of discovering the content in the first instance, e.g., a client might acquire a C-URN as part of a specific request for a C-URN target content object while browsing the network. However, it is also noted that a client user may also wish for certain content for which the user does not know the C-URN. FIG. 8 is an exemplary block diagram showing how a client obtains a C-URN for a given piece of content, where the C-URN is not already known.

In this regard, as shown in FIG. 8, a variety of options can be implemented to provide client 800 with the C-URN. At 805, the client specifies part of the content and/or some or all of any properties associated with the content, such that any means for retrieving C-URNs 810 receives the partial content or properties and responds at 820 with the appropriate C-URNs for the request. C-URN retrieval means 810 can include any one or more of a C-URN lookup service 812, a C-URN directory service 814, a C-URN search engine 816, a C-URN address management service 818. Client 800 can cache information retrieved from C-URN retrieval means 810 at any time for local access and any of the means 810 can be organized according to a centralized or distributed architecture.

Thus, when a client seeks to access content, where it does not already have a C-URN for desired content, it first obtains the C-URN for that content. As illustrated in connection with FIG. 8, C-URNs can be obtained through search engines, directories, or other address management mechanisms.

Figure 9:
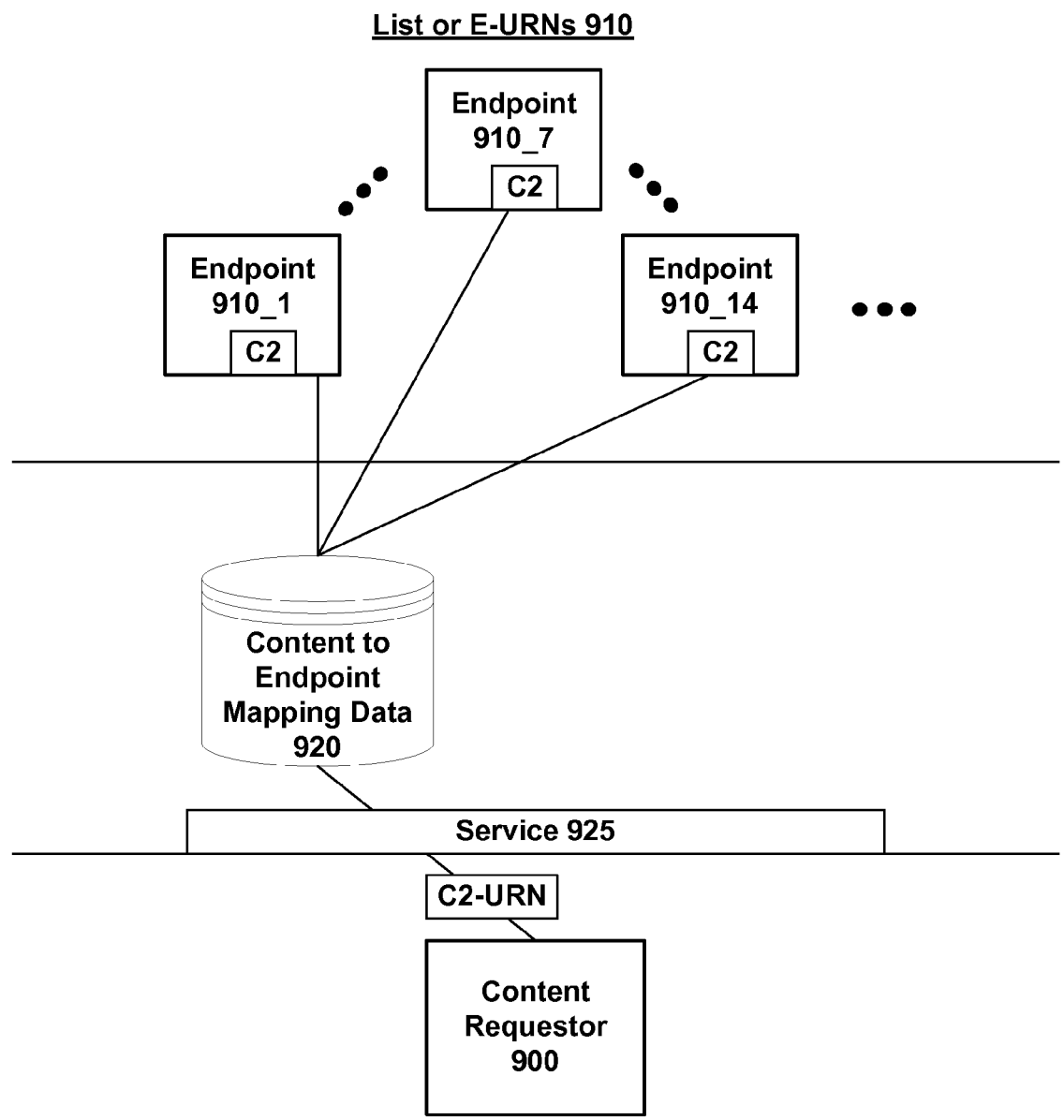
FIG. 9 illustrates an exemplary determination of a content swarm by consulting a content to endpoint mapping data store in accordance with the invention.

Next, as shown in the block diagram of FIG. 9, the C-URN obtained by a client 900, e.g., obtained according to the processes of FIG. 8, is mapped by a lookup service 925 in accordance with the invention to a list of candidate E-URNs 910 by querying through the content mapping table 920. For instance, in FIG. 9, the list of E-URNs 910 that include content C2 associated with the C2-URN specified by client 900 includes endpoints 910_1, 910_7 and 910_14.

The list of E-URNs 910 may include a) content source hosts, b) active clients who are downloading that content and are willing to also serve it, and/or c) "helper" nodes furnished by ISPs or others to aid in the caching and delivery of content, i.e., anywhere that content may reside in the network such that the content is accessible by endpoints for retrieval. The lookup by service 925 of content mapping table 920 may be parameterized to specify a fixed number of results or characteristics about the result. In this regard, the collection of E-URNs 910 associated with the specified C-URN constitute a "content swarm." As mentioned above, the content swarm may, in the degenerate case, only include one host capable of delivering the content.

Figure 10:
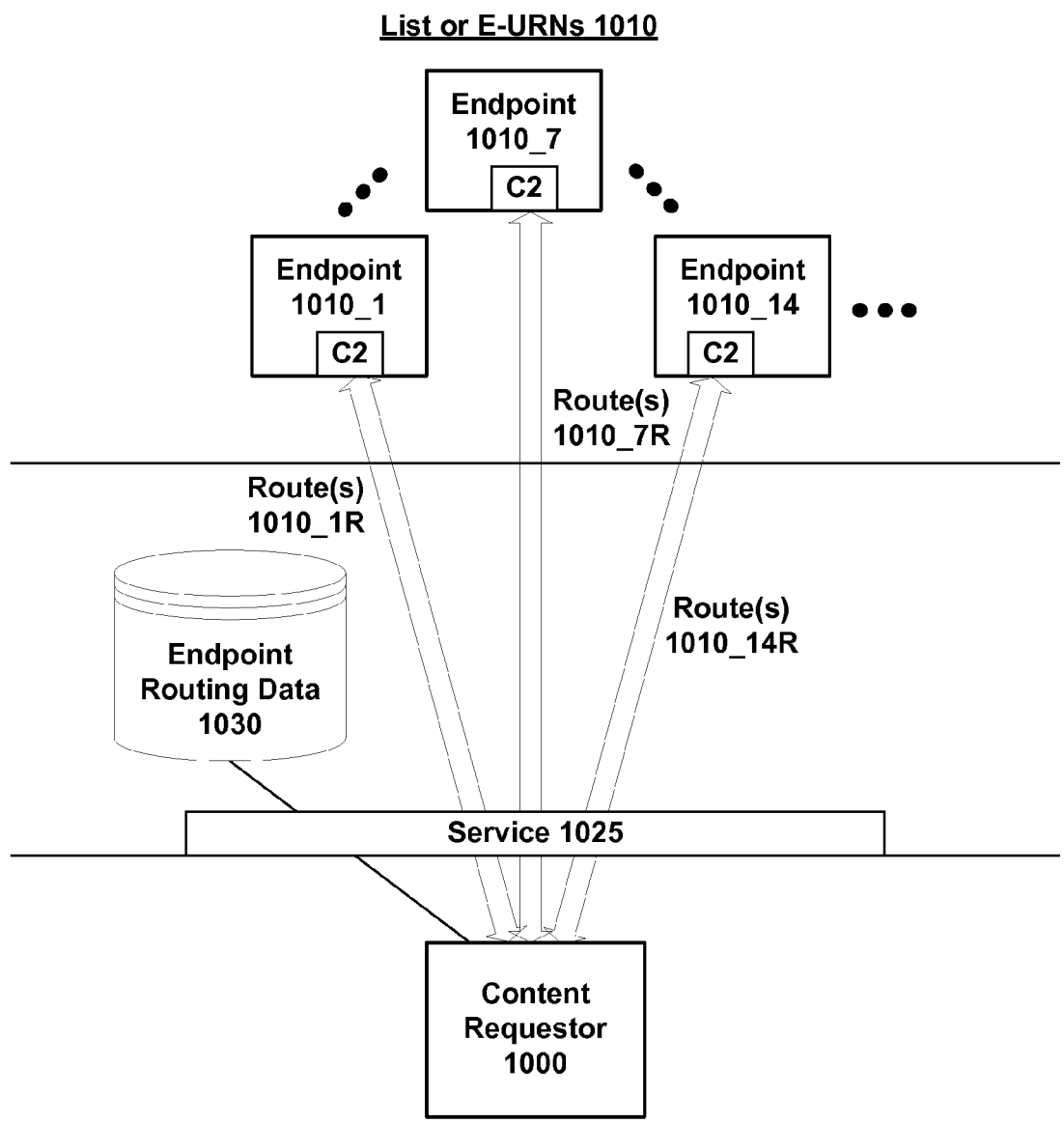
FIG. 10 illustrates an exemplary determination of candidate routes to endpoints defined by a content swarm in accordance with the invention.

Having determined the list of candidate endpoints, next, as shown by FIG. 10, candidate route(s) 1010_1R, 1010_7R and 1010_14R are determined to the endpoints identified by E-URNs 1010_1, 1010_7 and 1010_14 of list of candidates 1010. The host initiates a lookup in the endpoint routing table 1030 of service 1025. The lookup may be facilitated by network routers, or the host may be directly involved in the lookup process. Based on the size of the content swarm 1010, the client may select to lookup all or some of the available E-URNs. The client may also indicate how many routes should be computed for each E-URN, e.g., stop after computing X routes for each endpoint E-URN.

Optionally, in one embodiment, the route lookup in routing table 1030 also provides information about end-to-end characteristics, e.g., bandwidth, latency, jitter, reliability, etc. so that a client 1000 can make an optimal choice of route based on its needs. In alternative embodiments, the endpoint routing table may be managed by a central server. In this regard, a routing metric is any value used by a routing algorithm to determine whether one route should perform better than another. Metrics can cover, but are not limited to, such information as bandwidth, delay, hop count, path cost, load, maximum transmission unit (MTU), reliability, communication costs, and the like. In one embodiment, the routing table 1030 stores only the best possible routes.

For instance, network latency, loss rate and bandwidth are three relevant metrics for aiding in understanding path quality. Just for a few examples, the performance of online streaming applications directly depends on loss rate of the underlying network paths, the web browsing experience depends on network latency between client and server and file downloading time depends on network bandwidth. Thus, in accordance with the invention, the routing table 1030 gives clients visibility into the quality of the routes that are possible to the various endpoints E-URNs identified as part of a content swarm.

Figure 11:
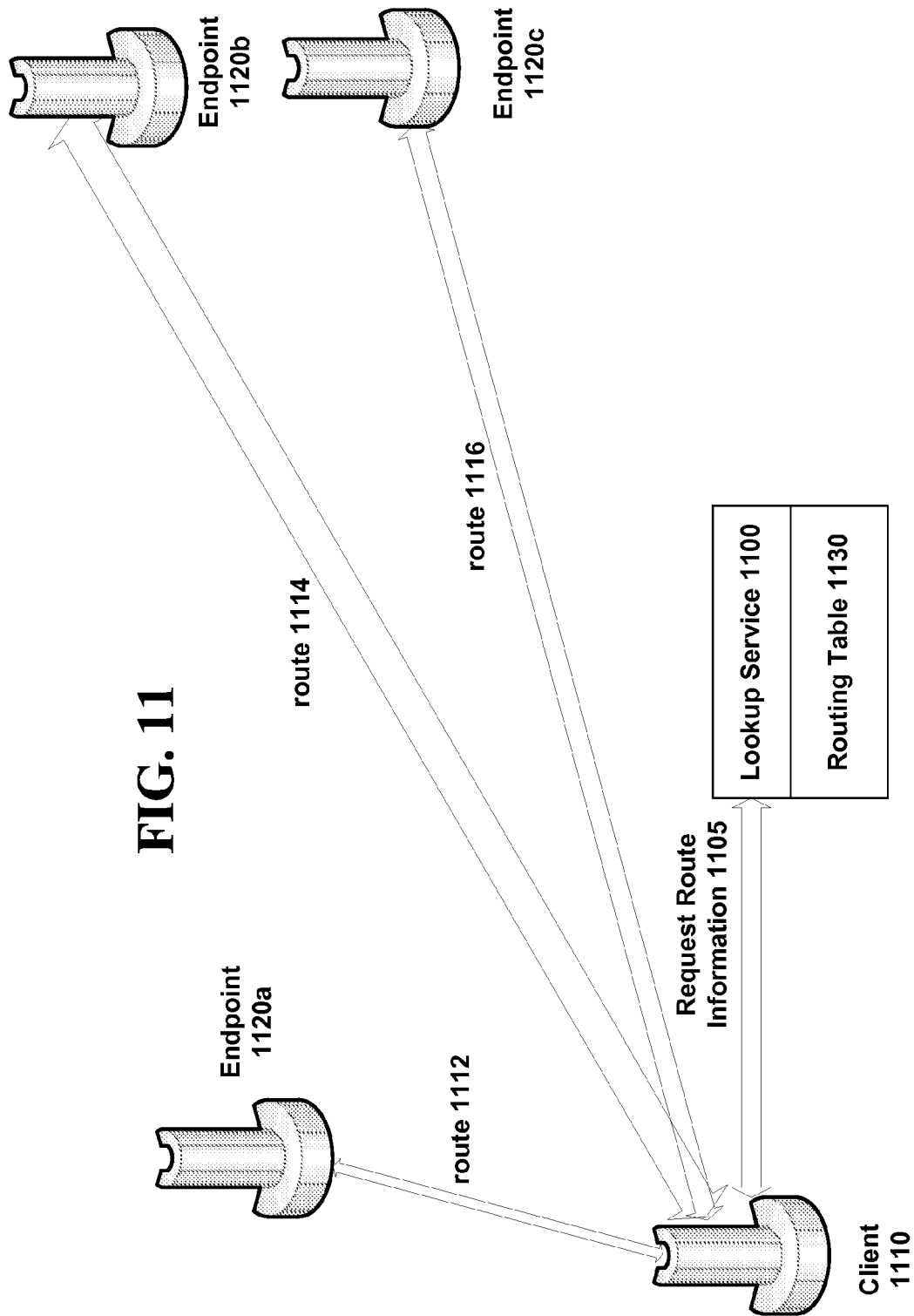
FIG. 11 illustrates an exemplary choice of candidate routes based on consulting a routing table and associated service in accordance with the invention.

Then, either the network service 1025 and/or the content requester 1000 select one or more routes to endpoints containing the content of interest. For instance, the client can select one or more routes based on aggregate class of service needs, e.g., bandwidth, latency, etc., i.e., any one or more of the factors mentioned above. This process is generally illustrated in the block diagram of FIG. 11 presenting a simple example of three different routes 1112, 1114 and 1116 defined for swarm endpoints 1120a, 1120b and 1120c, respectively, which can provide the content. In this regard, by consulting lookup service 1100 of the network at 1105, lookup service 1100 can gather the appropriate routing information for the specified routes via routing table 1130, which is dynamically updated on an ongoing basis with the cooperation of endpoints. For instance, in the example, the client 1110 might not wish to select route 1112 for lack of bandwidth for quality of service requirements of the client application.

Finally, the client completes its quest for the content by initiating download of the relevant content identified by its C-URN by initiating source-routed requests to the targeted E-URNs. The client can monitor the behavior of each route and can dynamically swaps route based on this dynamic information received about the actual quality of the route perceived by the client.

Figure 12:
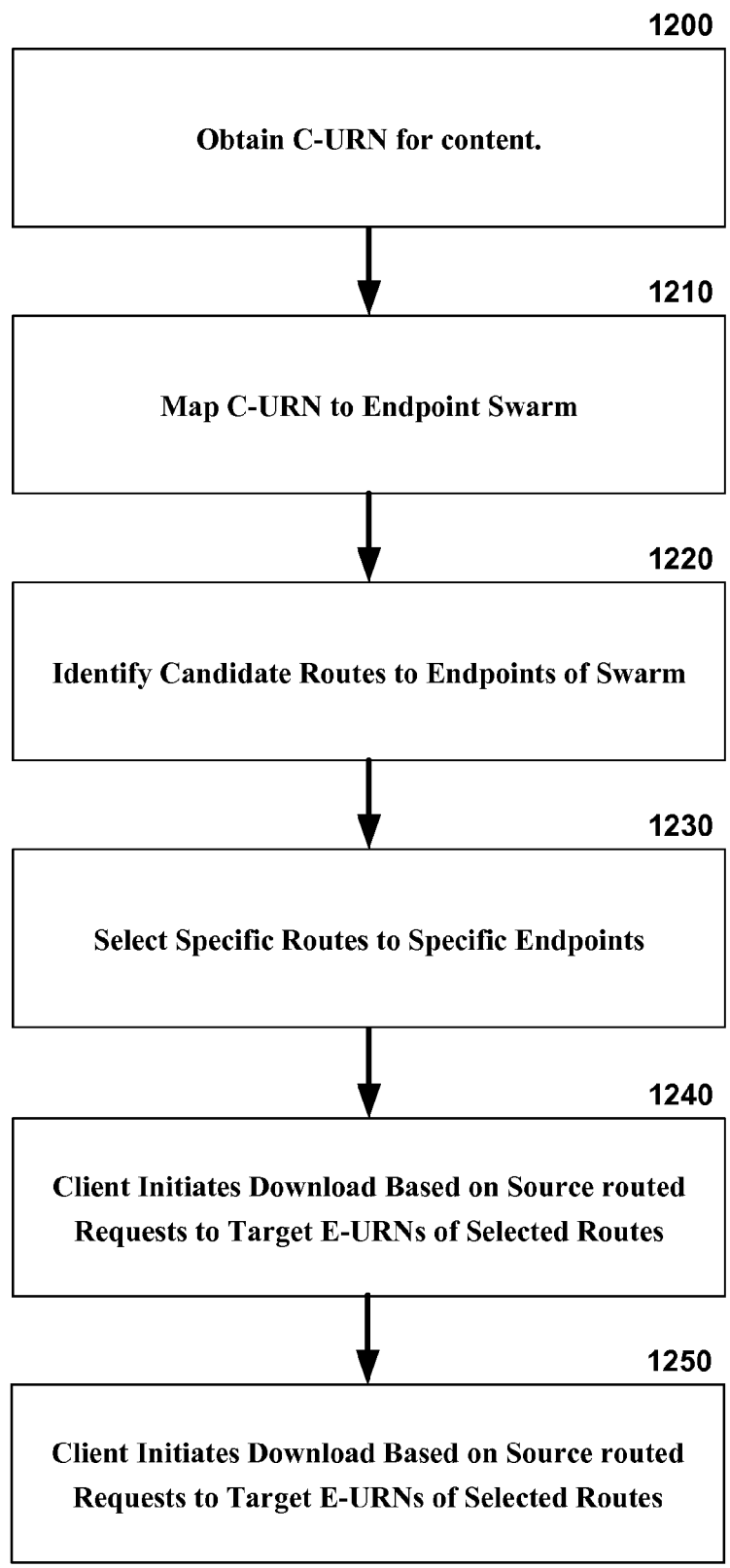
FIG. 12 is a flow diagram showing an exemplary, non-limiting process for completing a content request in accordance with the content swarm infrastructure provided by the invention.

A flow diagram encapsulating the above various processes is illustrated in FIG. 12. As shown in FIG. 12, at 1200, an endpoint requests a C-URN for desired content, e.g., via a search, directory, registry, or query service. Next, at 1210, the C-URN obtained at 1200 is mapped to an endpoint swarm of E-URNs that are appropriate for fulfilling the content request. At 1220, a set of candidate routes to the endpoints are examined via a endpoint routing table to determine what specific routes are optimal at 1230 for the requesting client's needs. At 1240, having designated the routes and endpoints to pursue, the client initiates download or streaming of the content based on source routed requests to the target E-URNs of the selected routes. Additionally, at 1250, the client can monitor the actual performance of the selected routes to verify performance requirements are being met, and if not, the flow can return to 1200 to retrieve a better, more up to date swarm to service the content request.

Supplemental Context Regarding Distributed Hash Tables

As mentioned, a content to endpoint mapping table and/or an endpoint routing table provided in accordance with the various embodiments of the invention described above can be implemented via distributed hash tables (DHTs). Accordingly, this section provides some supplemental context about DHTs as can be appreciated by one in the networking arts. DHTs are a class of decentralized distributed systems that provide a lookup service similar to a hash table. Basically, DHTs store (name, value) pairs, and any participating node can efficiently retrieve the value(s) associated with a given name. Responsibility for maintaining the mapping from names to values is distributed among the nodes in such a way that a change in the set of participants causes a minimal amount of disruption. This allows DHTs to scale to extremely large numbers of nodes and to handle continual node arrivals, departures, and failures.

DHTs form an infrastructure that can be used to build more complex services, such as distributed file systems, peer-to-peer file sharing and content distribution systems, cooperative web caching, multicast, anycast, domain name services, and instant messaging.

DHTs characteristically emphasize the following properties: (1) Decentralisation: the nodes collectively form the system without any central coordination. (2) Scalability: the system should function efficiently even with thousands or millions of nodes. (3) Fault tolerance: the system should be reliable even with nodes continuously joining, leaving, and failing.

As a non-limiting example, the structure of a DHT can be decomposed into several main components. The foundation is an abstract keyspace, such as the set of 160-bit strings. A keyspace partitioning scheme splits ownership of this keyspace among the participating nodes. An overlay network then connects the nodes, allowing them to find the owner of any given key in the keyspace.

Once these components are in place, a typical use of the DHT for storage and retrieval might proceed as follows. Suppose the keyspace is the set of 160-bit strings. To store a file with given filename and data in the DHT, the SHA1 hash of filename is found, producing a 160-bit key k, and a message put(k,data) is sent to any node participating in the DHT. The message is forwarded from node to node through the overlay network until it reaches the single node responsible for key k as specified by the keyspace partitioning, where the pair (k,data) is stored. Any other client can then retrieve the contents of the file by again hashing filename to produce k and asking any DHT node to find the data associated with k with a message get(k). The message will again be routed through the overlay to the node responsible for k, which will reply with the stored data.

All DHT topologies share some variant of the most essential property: for any key k, the node either owns k or has a link to a node that is closer to k in terms of the keyspace distance defined above. It is then easy to route a message to the owner of any key k using the following greedy algorithm: at each step, forward the message to the neighbor whose ID is closest to k. When there is no such neighbor, then we must have arrived at the closest node, which is the owner of k as defined above. This style of routing is sometimes called key based routing.

Exemplary Networked and Distributed Environments

One of ordinary skill in the art can appreciate that the invention can be implemented in connection with any computer or other client or server device, which can be deployed as part of a computer network, or in a distributed computing environment, connected to any kind of data store. In this regard, the present invention pertains to any computer system or environment having any number of memory or storage units, and any number of applications and processes occurring across any number of storage units or volumes, which may be used in connection with network routing services provided in accordance with the present invention. The present invention may apply to an environment with server computers and client computers deployed in a network environment or a distributed computing environment, having remote or local storage.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may request the network routing services of the invention.

Figure 13:
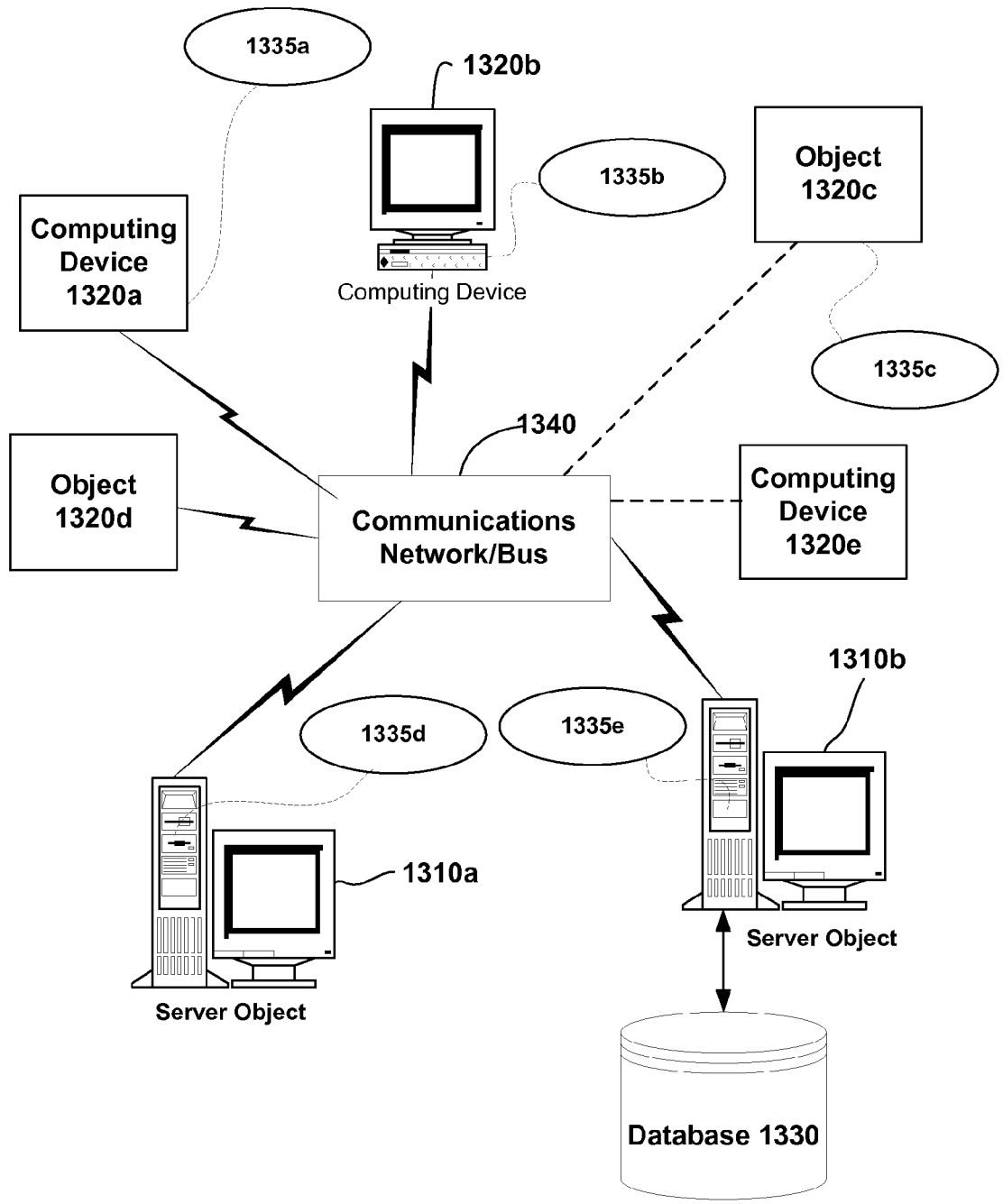
FIG. 13 is a block diagram representing an exemplary non-limiting networked environment in which the present invention may be implemented.

FIG. 13 provides a schematic diagram of an exemplary networked or distributed computing environment. The distributed computing environment comprises computing objects 1310*a*, 1310*b*, etc. and computing objects or devices 1320*a*, 1320*b*, 1320*c*, 1320*d*, 1320*e*, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 1340. This network may itself comprise other computing objects and computing devices that provide services to the system of FIG. 13, and may itself represent multiple interconnected networks. In accordance with an aspect of the invention, each object 1310*a*, 1310*b*, etc. or 1320*a*, 1320*b*, 1320*c*, 1320*d*, 1320*e*, etc. may contain an application that might make use of an API, or other object, software, firmware and/or hardware, suitable for communication with network routing services provided in accordance with the invention.

It can also be appreciated that an object, such as 1320*c*, may be hosted on another computing device 1310*a*, 1310*b*, etc. or 1320*a*, 1320*b*, 1320*c*, 1320*d*, 1320*e*, etc. Thus, although the physical environment depicted may show the connected devices as computers, such illustration is merely exemplary and the physical environment may alternatively be depicted or described comprising various digital devices such as PDAs, televisions, MP3 players, etc., any of which may employ a variety of wired and wireless services, software objects such as interfaces, COM objects, and the like, to connect to a network routing service in accordance with the invention.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to the network routing services of the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge, or already have emerged, as protocol standards may be interconnected to form a network, such as an intranet, that may be connected to the outside world by way of a wide area network, such as the Internet. In short, a variety of disparate sources exist for the storage and transmission of data, and consequently, any of the computing devices of the present invention may share and communicate data in any existing manner, and no one way described in the embodiments herein is intended to be limiting.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 13, as an example, computers 1320*a*, 1320*b*, 1320*c*, 1320*d*, 1320*e*, etc. can be thought of as clients and computers 1310*a*, 1310*b*, etc. can be thought of as servers where servers 1310*a*, 1310*b*, etc. maintain the data that is then replicated to client computers 1320*a*, 1320*b*, 1320*c*, 1320*d*, 1320*e*, etc., although any computer can be considered a client, a server, or both, depending on the circumstances. Any of these computing devices may be processing data, recording measurements or requesting services or tasks that may implicate the network routing services in accordance with the invention.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for performing intelligent mappings to network content of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 13 illustrates an exemplary networked or distributed environment, with server(s) in communication with client computer (s) via a network/bus, in which the present invention may be employed. In more detail, a number of servers 1310*a*, 1310*b*, etc. are interconnected via a communications network/bus 1340, which may be a LAN, WAN, intranet, GSM network, the Internet, etc., with a number of client or remote computing devices 1320*a*, 1320*b*, 1320*c*, 1320*d*, 1320*e*, etc., such as a portable computer, handheld computer, thin client, networked appliance, or other device, such as a VCR, TV, oven and the like in accordance with the present invention. It is thus contemplated that the present invention may apply to any computing device in connection with which it is desirable to request network services.

In a network environment in which the communications network/bus 1340 is the Internet, for example, the servers 1310a, 1310b, etc. can be Web servers with which the clients 1320a, 1320b, 1320c, 1320d, 1320e, etc. communicate via any of a number of known protocols such as HTTP. Servers 1310a, 1310b, etc. may also serve as clients 1320a, 1320b, 1320c, 1320d, 1320e, etc., as may be characteristic of a distributed computing environment.

As mentioned, communications may be wired or wireless, or a combination, where appropriate. Client devices 1320a, 1320b, 1320c, 1320d, 1320e, etc. may or may not communicate via communications network/bus 14, and may have independent communications associated therewith. Each client computer 1320a, 1320b, 1320c, 1320d, 1320e, etc. and server computer 1310a, 1310b, etc. may be equipped with various application program modules or objects 1335a, 1335b, 1335c, etc. and with connections or access to various types of storage elements or objects, across which files or data streams may be stored or to which portion(s) of files or data streams may be downloaded, transmitted or migrated. Any one or more of computers 1310a, 1310b, 1320a, 1320b, 1320c, 1320d, 1320e, etc. may be responsible for the maintenance and updating of a database 1330 or other storage element, such as a database or memory 1330 for storing data processed or saved according to the invention. Thus, the present invention can be utilized in a computer network environment having client computers 1320a, 1320b, 1320c, 1320d, 1320e, etc. that can access and interact with a computer network/bus 1340 and server computers 1310a, 1310b, etc. that may interact with client computers 1320a, 1320b, 1320c, 1320d, 1320e, etc. and other like devices, and databases 1330.

Exemplary Computing Device

Figure 14:
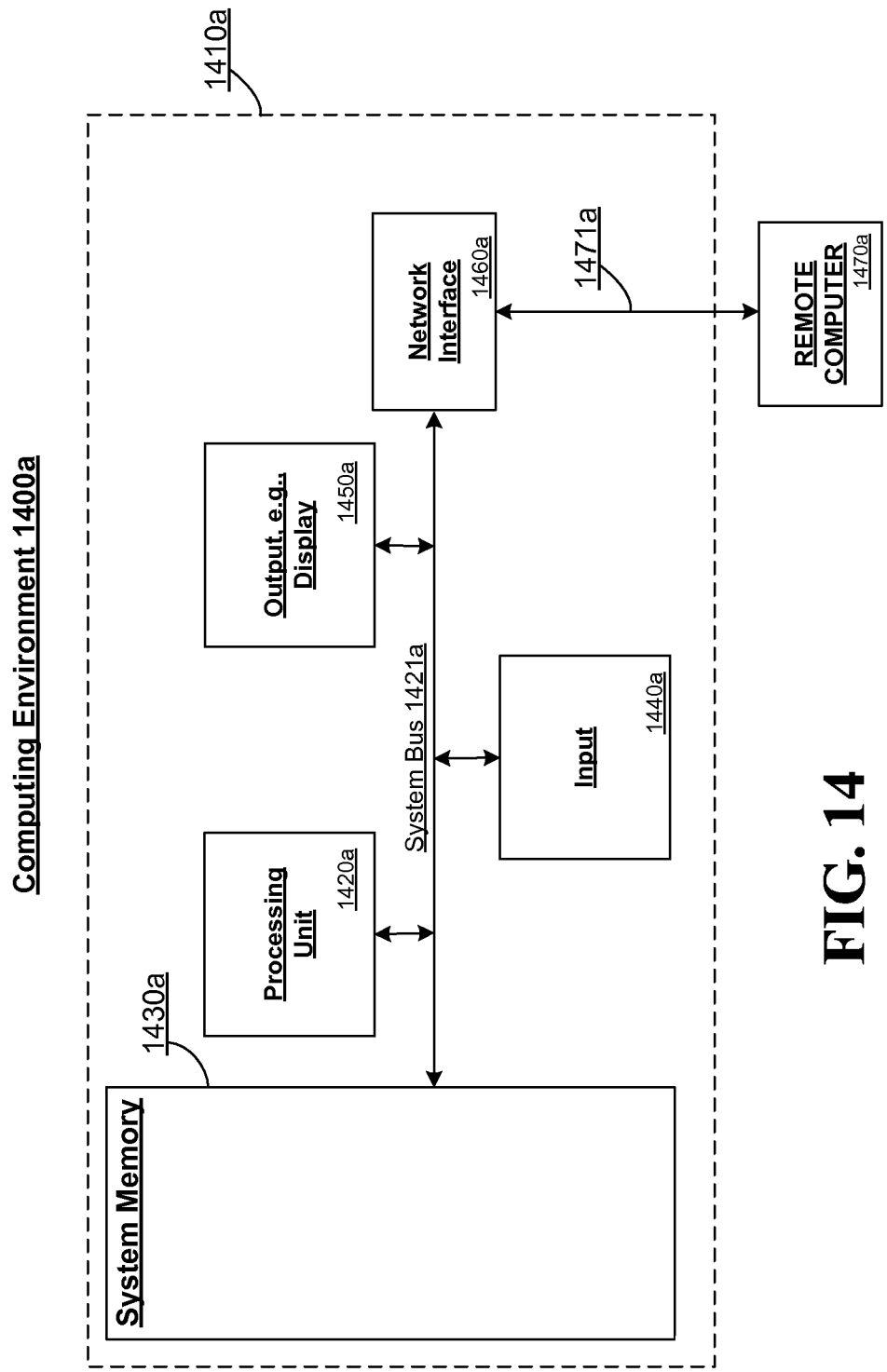
FIG. 14 is a block diagram representing an exemplary non-limiting computing system or operating environment in which aspects of the present invention may be implemented.

As mentioned, the invention applies to any device wherein it may be desirable to request network services. It should be understood, therefore, that handheld, portable and other computing devices and computing objects of all kinds are contemplated for use in connection with the present invention, i.e., anywhere that a device may request network routing services for content in a network. Accordingly, the below general purpose remote computer described below in FIG. 14 is but one example, and the present invention may be implemented with any client having network/bus interoperability and interaction. Additionally, service endpoints and/or beacon nodes can include, but are not limited to, functionality of the below general purpose computer.

As mentioned above, the present invention may be implemented in an environment of networked hosted services in which very little or minimal client resources are implicated, e.g., a networked environment in which the client device serves merely as an interface to the network/bus, such as an object placed in an appliance.

Although not required, the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 14 thus illustrates an example of a suitable computing system environment 1400a in which the invention may be implemented, although as made clear above, the computing system environment 1400a is only one example of a suitable computing environment for a media device and is not intended to suggest any limitation as to the scope of use or functionality of the invention. Neither should the computing environment 1400a be interpreted as having any dependency or requirement relating to any one or combination of components illustrated in the exemplary operating environment 1400a.

With reference to FIG. 14, an exemplary remote device for implementing the invention includes a general purpose computing device in the form of a computer 1410a. Components of computer 1410a may include, but are not limited to, a processing unit 1420a, a system memory 1430a, and a system bus 1421a that couples various system components including the system memory to the processing unit 1420a. The system bus 1421a may be any of several types of bus structures including a memory bus or memory controller, a peripheral bus, and a local bus using any of a variety of bus architectures.

Computer 1410a typically includes a variety of computer readable media. Computer readable media can be any available media that can be accessed by computer 1410a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1410a. Communication media typically embodies computer readable instructions, data structures, program modules or other data in a modulated data signal such as a carrier wave or other transport mechanism and includes any information delivery media.

The system memory 1430a may include computer storage media in the form of volatile and/or nonvolatile memory such as read only memory (ROM) and/or random access memory (RAM). A basic input/output system (BIOS), containing the basic routines that help to transfer information between elements within computer 1410a, such as during start-up, may be stored in memory 1430a. Memory 1430a typically also contains data and/or program modules that are immediately accessible to and/or presently being operated on by processing unit 1420a. By way of example, and not limitation, memory 1430a may also include an operating system, application programs, other program modules, and program data.

The computer 1410a may also include other removable/non-removable, volatile/nonvolatile computer storage media. For example, computer 1410a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 1421a through a non-removable memory interface such as an interface, and a magnetic disk drive or optical disk drive is typically connected to the system bus 1421a by a removable memory interface, such as an interface.

A user may enter commands and information into the computer 1410a through input devices such as a keyboard and pointing device, commonly referred to as a mouse, trackball or touch pad. Other input devices may include a microphone, joystick, game pad, satellite dish, scanner, or the like. These and other input devices are often connected to the processing unit 1420a through user input 1440a and associated interface(s) that are coupled to the system bus 1421a, but may be connected by other interface and bus structures, such as a parallel port, game port or a universal serial bus (USB). A graphics subsystem may also be connected to the system bus 1421a. A monitor or other type of display device is also connected to the system bus 1421a via an interface, such as output interface 1450a, which may in turn communicate with video memory. In addition to a monitor, computers may also include other peripheral output devices such as speakers and a printer, which may be connected through output interface 1450a.

The computer 1410a may operate in a networked or distributed environment using logical connections to one or more other remote computers, such as remote computer 1470a, which may in turn have media capabilities different from device 1410a. The remote computer 1470a may be a personal computer, a server, a router, a network PC, a peer device or other common network node, or any other remote media consumption or transmission device, and may include any or all of the elements described above relative to the computer 1410a. The logical connections depicted in FIG. 14 include a network 1471a, such local area network (LAN) or a wide area network (WAN), but may also include other networks/buses. Such networking environments are commonplace in homes, offices, enterprise-wide computer networks, intranets and the Internet.

When used in a LAN networking environment, the computer 1410a is connected to the LAN 1471a through a network interface or adapter. When used in a WAN networking environment, the computer 1410a typically includes a communications component, such as a modem, or other means for establishing communications over the WAN, such as the Internet. A communications component, such as a modem, which may be internal or external, may be connected to the system bus 1421a via the user input interface of input 1440a, or other appropriate mechanism. In a networked environment, program modules depicted relative to the computer 1410a, or portions thereof, may be stored in a remote memory storage device. It will be appreciated that the network connections shown and described are exemplary and other means of establishing a communications link between the computers may be used.

There are multiple ways of implementing the present invention, e.g., an appropriate API, tool kit, driver code, operating system, control, standalone or downloadable software object, etc. which enables applications and services to use the network routing services of the invention. The invention contemplates the use of the invention from the standpoint of an API (or other software object), as well as from a software or hardware object that provides network routing services in accordance with the invention. Thus, various implementations of the invention described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned above, while exemplary embodiments of the present invention have been described in connection with various computing devices and network architectures, the underlying concepts may be applied to any computing device or system in which it is desirable to request network services. For instance, the network routing services of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the network routing services of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") where used herein is intended to encompass a computer program accessible from any computer-readable device, carrier, or media. For example, computer readable media can include but are not limited to magnetic storage devices (e.g., hard disk, floppy disk, magnetic strips ... ), optical disks (e.g., compact disk (CD), digital versatile disk (DVD) ... ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers ... ). Such components, inter alia, can automate certain mechanisms or processes performed thereby to make portions of the systems and methods more adaptive as well as efficient and intelligent.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of particular programming language constructs, the invention is not so limited, but rather may be implemented in any language to provide the network routing services of the various embodiments of the invention. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

A lookup service for facilitating a determination of nodes in a network that can provide a service with respect to designated content, comprises at least one data store for storing substantially up to date content mapping information, independent of type of content, which maps unique content identifiers, each identifying a content item independent of location, to a set of nodes of the network including the associated content item; and a lookup service, communicatively coupled to the at least one data store, which, in response to a request specifying a content item, determines a set of nodes of the network that can satisfy the request based on the content mapping information.

What is claimed is:

1. A system comprising:
one or more processors;
memory communicably coupled to the one or more processors, the memory comprises:
substantially up to date content mapping information, independent of a type of content, which maps each unique content identifier corresponding to a content item of a plurality of unique content identifiers corresponding to a plurality of content items to a set of nodes of a network that each includes the content item;

substantially up to date end-to-end routing information for routes between node pairs of the nodes of the network, the end-to-end routing information comprising one or more routing characteristics; and a lookup service module which, when executed by the one or more processors and in response to a request specifying a particular content item and one or more classes of service parameters:

determines a plurality of nodes of the network that satisfy the request based on the content mapping information, a determination of the plurality of nodes of the network being independent of a location of each node of the plurality of nodes of the network; and selects at least one route associated with the plurality of nodes based at least on the end-to-end routing information and the one or more class of service parameters.

2. The system according to claim 1, wherein the substantially up to date content mapping information is stored on a distributed data store.

3. The system according to claim 2, wherein the substantially up to date content mapping information is stored on a data store and implemented with distributed hash tables (DHTs).

4. The system according to claim 1, wherein the plurality of nodes of the network include any one or more of source hosts for the content item, active clients including the content item or intermediate hosts that have cached the content item.

5. The system according to claim 1, wherein the one or more routing characteristics comprise any one or more of bandwidth, loss rate and latency of routes between node pairs of the nodes of the network.

6. The system according to claim 1, wherein the substantially up to date end-to-end routing information is stored on a data store and implemented with distributed hash tables (DHTs).

7. A method for proactively determining optimal service endpoints for providing content in a network, comprising:

based on a request for a content stream of interest including a unique content identifier that is independent of location of the content stream, receiving, by a requesting endpoint, information representing a set of candidate endpoints from a network service that each includes the content stream of interest, wherein the set of candidate endpoints is provided to the requesting endpoint independent of respective candidate endpoint locations;

based on at least one predetermined criterion associated with the request and information retrieved from a data store comprising substantially up to date end-to-end routing information for routes between the requesting endpoint and the endpoints of the candidate endpoints of the network service, selecting, by the requesting endpoint, at least one candidate endpoint of the set of candidate endpoints for provision of a service relating to the content stream of interest, the end-to-end routing information comprising one or more routing characteristics, the one or more routing characteristics of the selected at least one candidate endpoint comprises a latency value, wherein the at least one predetermined criterion comprises a latency performance parameter; and based on an increase in the latency value associated with the selected at least one candidate endpoint that results in failing to meet the latency performance parameter, switching to at least a second candidate endpoint of the set of candidate endpoints for provision of the service relating to the content stream of interest in response to determining that a latency value associated with the at least the second candidate endpoint satisfies the latency performance parameter.

8. The method according to claim 7, further comprising:
receiving routing quality information that facilitates the selecting of the at least one candidate endpoint based on measurements of the quality of routes to the at least one candidate endpoint.

9. The method according to claim 8, wherein the one or more routing characteristics further comprise one or more of bandwidth, network distance, cost or loss rate metrics, further comprising:

selecting one or more optimal routes to the at least one candidate endpoint from the requesting endpoint based on one or more of bandwidth, the latency value, network distance, cost or loss rate metrics received with respect to one or more routes between the requesting endpoint and the at least one candidate endpoint.

10. The method of claim 8, further comprising:
determining, based on the quality of routes to the at least one candidate endpoint, whether a quality of service requirement is met for an application or service associated with the request.

11. The method of claim 7, wherein the provision of the service relating to the content stream of interest includes enabling a downloading or streaming operation by the requesting endpoint.

12. The method of claim 7, wherein the provision of the service relating to the content stream of interest includes enabling a real-time rendering operation by the requesting endpoint.

13. A method for determining optimal routes to optimal service endpoints for providing service with respect to one or more specified items of content in a network, comprising:

receiving, in response to a content stream of interest request by a requesting endpoint of a network, first information including unique endpoint identifier information representing a set of candidate endpoints from a network service, the unique endpoint identifier information being independent of a location of each of the candidate endpoints, each of the candidate endpoints capable of providing a service with respect to the content stream of interest, each unique endpoint identifier assigned to each candidate endpoint at the time the candidate endpoint joined the network;

receiving, by the requesting endpoint, second information representing route quality information concerning at least one characteristic of at least one endpoint to endpoint route between the requesting endpoint and the set of candidate endpoints, the second information retrieved from a data store comprising substantially up to date end-to-end routing information for routes between endpoints of the endpoints of the network, the end-to-end routing information comprising at least bandwidth information; and based on an analysis of the second information representing route quality information and a class of service parameter associated with the content stream of interest, connecting to a subset of the set of candidate endpoints via a specific one or more of the at least one endpoint to endpoint route.

14. The method of claim 13, wherein the receiving of the second information includes receiving information about the at least one endpoint to endpoint route from a plurality of network routers tracking network state.

15. The method of claim 13, wherein the end-to-end routing information further comprises latency, jitter, or reliability of the at least one endpoint to endpoint route.

16. The method of claim 15, wherein the class of service parameter comprises a latency class of service need, wherein the connecting to the subset of the set of candidate endpoints is further based on the latency associated with the end-to-end routing information of the subset of the set of candidate endpoints and the latency class of service need.

17. The method of claim 13, further comprising:
    monitoring the specific one or more of the at least one endpoint to endpoint route to determine actual quality of service information associated with the at least one endpoint to endpoint route.

18. The method of claim 13, wherein the content stream of interest comprises content where a unique content identifier identifying content independent of location is unknown prior to a request for the content, wherein the unique content identifier is determined based at least in part on part of the content, a property associated with the content, or both.

19. The system according to claim 1, wherein the determination of the plurality of nodes comprises computing routes between node pairs based at least in part on the one or more class of service parameters and a maximum number of routes computed between each of the node pairs.

* * * * *